Dec. 11, 1951 J. Y. TAYLOR 2,578,106
OPAQUE PROJECTION APPARATUS WITH
ADJUSTABLE TRAY AND PLATEN MEANS
Filed July 19, 1949 3 Sheets-Sheet 1

INVENTOR.
JAMES Y. TAYLOR
BY
Raymond A. Paquin ATTORNEY

Dec. 11, 1951

J. Y. TAYLOR
OPAQUE PROJECTION APPARATUS WITH
ADJUSTABLE TRAY AND PLATEN MEANS 2,578,106

Filed July 19, 1949

INVENTOR.
JAMES Y. TAYLOR
BY
Raymond A. Faquin
ATTORNEY

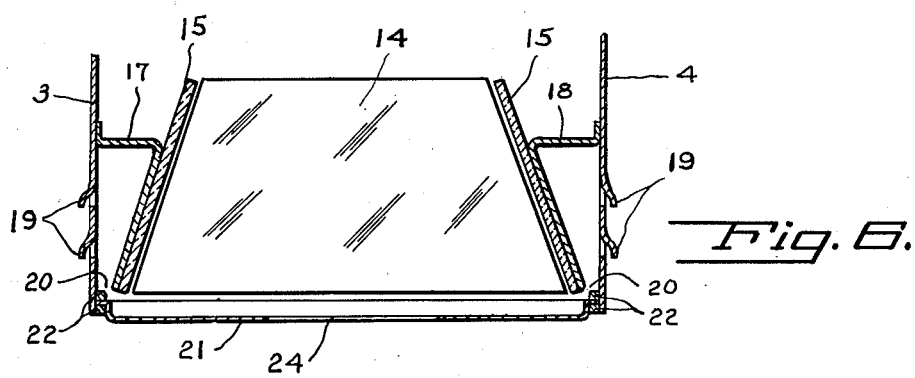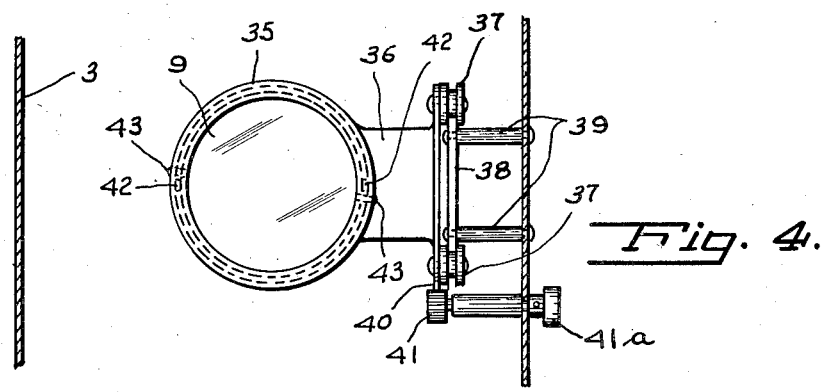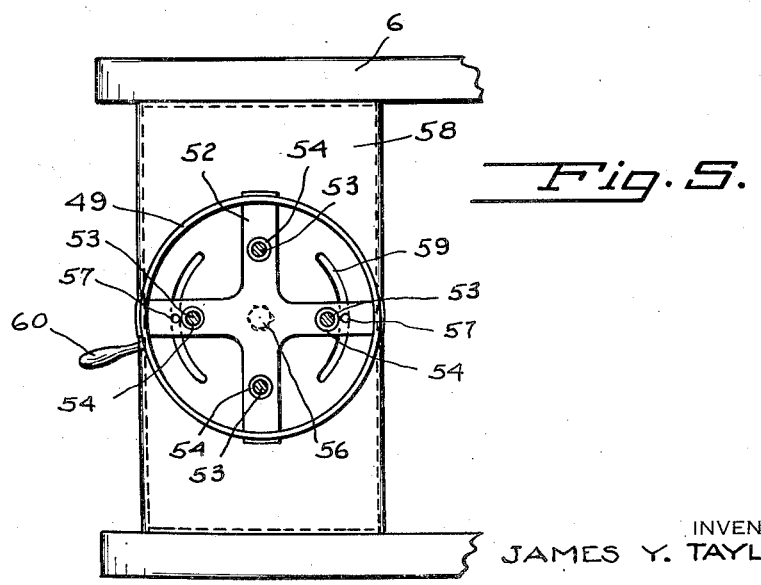

Patented Dec. 11, 1951

2,578,106

UNITED STATES PATENT OFFICE 2,578,106

OPAQUE PROJECTION APPARATUS WITH ADJUSTABLE TRAY AND PLATEN MEANS

James Y. Taylor, Garland, Tex.

Application July 19, 1949, Serial No. 105,469

10 Claims. (Cl. 88—24)

This invention relates to projection apparatus and has particular reference to a new and improved projector of the type employed for projecting opaque or non-transparent material.

An object of the invention is to provide new and improved supporting and positioning means for the material to be projected.

Another object of the invention is to provide a new and improved lens supporting and focusing arrangement for projectors.

Another object is to provide a cooling device for the material to be projected which device may be controlled so as to facilitate the positioning of the material to be projected in operative position.

Another object is to provide a new and improved cooling and ventilating system for projectors of the type set forth.

Another object is to provide a projector of the type set forth which is lighter in weight, and will provide more light at lower operating temperatures in a smaller or more compact size projector with a relatively large projection aperture as compared with prior type projectors.

Other objects and advantages of the invention will be apparent from the following description taken in connection with the accompanying drawings. It will be understood that changes may be made in the details of construction and arrangement of parts without departing from the scope of the invention as set forth in the accompanying claims. I, therefore, do not wish to be limited to the exact details shown and described as the preferred form has been given by way of illustration only.

Referring to the drawings:

Fig. 4 is a fragmentary sectional view taken on line 4—4 of Fig. 1, looking in the direction of the arrows;

Fig. 5 is a sectional view taken on line 5—5 of Fig. 1, looking in the direction of the arrows; and Fig. 6 is a fragmentary sectional view taken on line 6—6 of Fig. 1, looking in the direction of the arrows.

Figure 1:
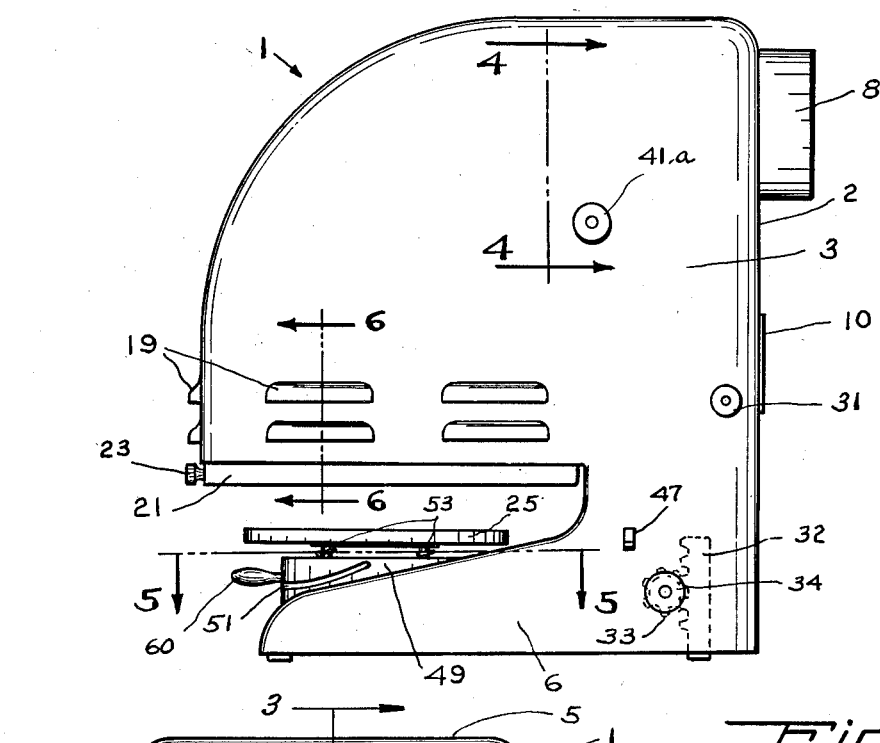
Fig. 1 is a side view of a projector embodying the invention.
Figure 2:
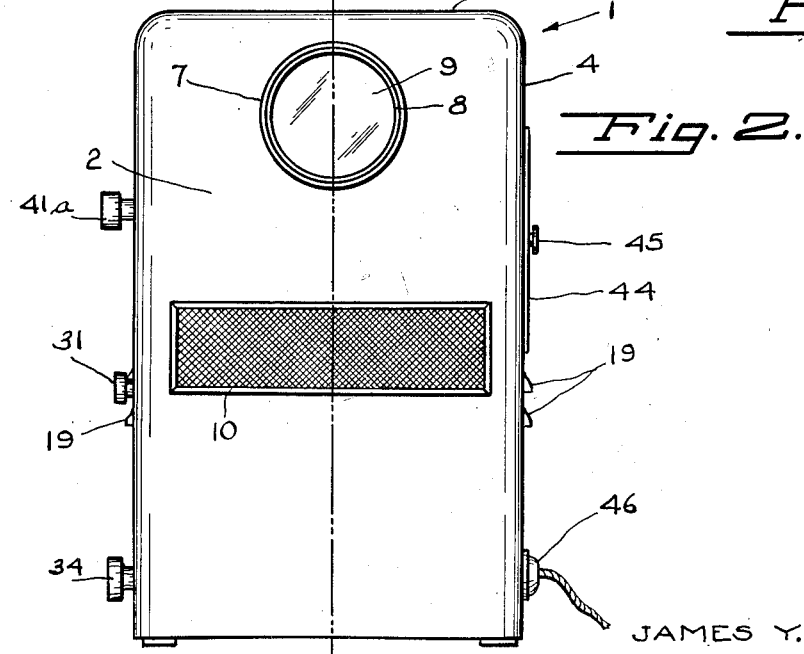
Fig. 2 is a front view thereof.

Referring more particularly to the drawings wherein similar reference characters designate corresponding parts throughout the various views, the projection apparatus shown embodying the invention comprises a housing or casing indicated generally at 1 and formed of sheet metal and including the front wall 2, side walls 3 and 4, composite blended top and rear walls 5 and base 6 for supporting the housing in an upright position.

The front wall 2 is provided with a circular opening 7 for the receiving of the barrel 8 for the objective lens system 9 and said wall 2 is also provided with the air exhaust opening 10 over which may be placed a screen as shown.

Within housing 1 is positioned the front surface mirror 11 which is so positioned as to direct reflected light from the material being projected through said objective lens system 9 in barrel 8 and the reflector 12 is positioned behind lamp 13 and adapted to direct light from said lamp onto the material being projected. The mirrors 14 and 15 are end and side mirrors respectively for distributing light from lamp 13 evenly over the material being projected.

The mirrors 14 and 15 are secured to the supports 16 and 17 respectively which are supported by the combined air baffles and supports 18 which are secured to the walls 3 and 4 and rear wall 5 and serve to support said mirrors 14 and 15 in operative position and also to direct air entering the casing 1 through louvers 19 in the walls 3, 4 and 5, through slots 20 from which it is drawn across the surface of the material being projected to cool the same and prevent damage thereto by heat from lamp 13.

Beneath the projection opening in the lower wall of the casing 1 is positioned the sliding tray 21 having its opposite side edges slidably mounted in guide-ways 22 and said tray 21 is provided with the knob or handle 23 for use in inserting or removing the tray.

The tray 21 is for use when single paper sheets or pictures or other thin articles are projected. The bottom of tray 21 is provided with an opening 24 which is normally covered by a removable plate or bottom (not shown) when the tray 21 is used for the projection of single sheets or pictures as stated above and said removable bottom is removed for the projection of a magazine or book page which magazine or book is positioned on platen 25 so that it can then be projected without removing the tray proper 21. The slots 20 and tray 21 direct the cooling air stream across the surface of the material being projected to cool the same and protect it from damage by heat from lamp 13. The air is exhausted through opening 10 in the front wall of casing 1 which it reaches through a duct 26 which is formed by wall 27 and said duct is in communication with blower 28 which is driven by motor 29.

In duct 26 there is provided the butterfly valve 30 adapted to be adjusted by the control knob 31, externally of casing 1, whereby the air exhausted may be reduced when light weight paper sheets or pictures or the like are to be put in projection position. This adjustment of butterfly valve 30 to reduce the air exhausted prevents such light weight sheets from being drawn accidentally into the projector by the air stream. The valve 30 may be opened after such light weight sheets are in projection position to properly cool and ventilate them as the opening of such valve allows exhaust of air from the casing through duct 16 by blower 28 thereby drawing an air stream into the casing through louvers 19 and across the material to be projected when said heated air is exhausted as described above.

As will be noted, air is exhausted from the housing 1 instead of being blown about within the projector as is the conventional procedure. This exhaust type cooling keeps the entire housing 1 cool to the touch at all times and results in lower surface temperatures on the copy or material being projected.

Masks of various size apertures may be used to hold the copy or material to be projected within tray 21 and small items such as stamps may be held in place by using small permanent magnets. These are used when the solid sheet metal bottom is in place in the tray 21 covering the aperture 24.

The housing or casing 1 is preferably provided at the opposite sides of its front and with the racks 32 and pinions 33 which are controlled by knob 34, externally of casing 1, for elevating or lowering the front of the projector to thereby adjust the objective lens system 9 so that it will project on the screen.

Objective barrel 8 containing objective or projection lens system 9 is mounted in sleeve 35 which is secured to bracket and plate 36 which carries rollers 37 engaging plate 38 as a track. This plate 36 is rigidly fastened to wall 4 of housing 1 by studs 39. On the bottom of combination bracket and plate 36 is mounted rack 40 which engages pinion 41. Turning knob 41a moves the entire lens holder forward and backward. This movement is made smooth by rollers 37 as they bear against track 38.

Lens tube or barrel 8 is fitted with slots 42 which receive pins 43 which are rigidly secured to sleeve 35. When lens barrel 8 is inserted into sleeve 35 so that pins 43 enter slots 42, turning of the lens barrel 8 will lock it in position. Reversal of this operation will remove lens barrel 8 so that objectives of different focal length may be employed.

The housing 1 is provided with a door 44 which may be opened or closed by handle or knob 45 to allow access to the interior of the housing. Electrical connection 46 is provided for connection with a source of electrical current control switch 47 which is provided for controlling the current supply to lamp 13 and motor 29.

The light baffle 48 is provided to keep stray light out of the path of the objective lens system. This baffle may be secured to the front wall 2 of housing 1 as shown in Fig. III.

The platen 25 is a spiral lift construction consisting of a sleeve 49 closed at the bottom by plate 50. The sleeve has cut therein a plurality of spiral slots 51, preferably four, suitably spaced around the periphery of sleeve 49, but which may be of other satisfactory number. These slots engage the extreme ends of cross structure 52, rising from which to support platen 25 are posts 53 on each of which are mounted compression springs 54 which bear against bracket 55 at their upper end, which bracket 55 is secured to the lower side of platen 25 to provide a resilient mounting for platen 25. Sleeve 49 is pivotally mounted on pin 56 while cross 52 is slidably mounted on pins 57. These pins are in turn rigidly fastened to plate 58. Slots 59 in base plate 50 of sleeve 49 allow said sleeve to be moved in a circular path about ninety degrees. This movement is actuated by moving handle 60 which is secured to sleeve 49.

As sleeve 49 turns, the spiral slots 51 lift the cross structure 52 causing posts 53 and springs 54 to push platen upward toward aperture 24 in bottom of tray 21. Reversing movement of handle 60 causes cross structure 52 to lower and thus bring platen 25 down to open position for insertion and removal of material to be projected.

Figure 3:
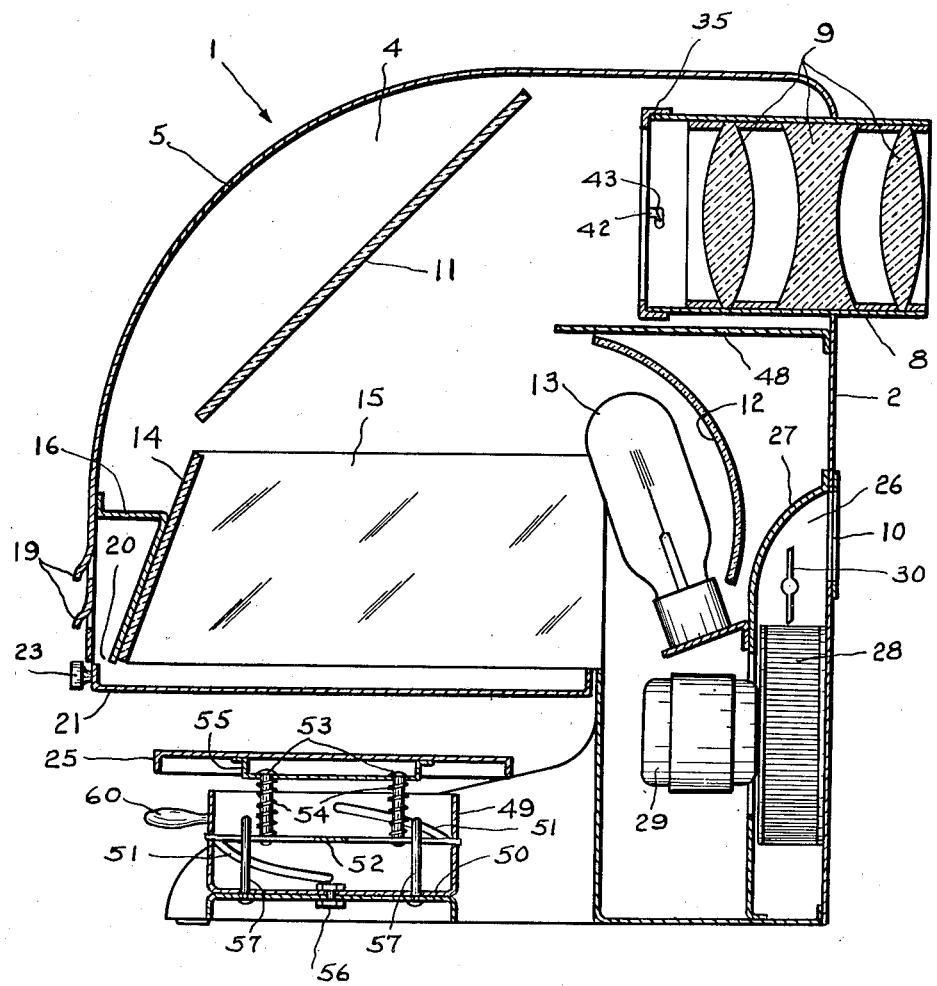
Fig. 3 is a sectional view taken on line 3—3 of Fig. 2, looking in the direction of the arrows.

In Fig. 3, spiral sleeve bottom 50 is shown resting on base plate 58. In operation, pressure or weight on platen 25 will be transmitted through cross structure 52 and spiral slots 51 to spiral sleeve bottom 50. Since the ends of the cross structure 52 are carried in spiral slots 51, there will be a tendency for spiral sleeve 49 to revolve and lower platen 25. However, such weight or pressure also produces friction between the two plates 50 and 58. A layer of felt or similar material between these plates increases such friction until spiral sleeve 49 will not turn unless manually operated by handle 60.

The above structure places all necessary parts into as small a space as possible so as to eliminate bulk and weight and yet provides a large projection aperture which is highly desirable.

All of the controls are on one side of the projector and a practical and relatively inexpensive arrangement is provided for rack and pinion adjustment of the objective which may be of large diameter and heavy and of which easy and quick adjustment is desired.

Also, the platen lift and sliding tray arrangements are believed to offer distinct advantages over prior constructions.

From the foregoing it will be seen that I have provided relatively simple and economical, yet efficient means for obtaining all of the objects and advantages of the invention.

Having described my invention, I claim:

1. In a projector for projecting opaque material, a casing, a light source and reflectors in said casing, means for supporting material to be projected and a barrel containing a projector lens system, means in said casing for adjustably mounting said barrel and lens system comprising a rigidly supported track, a bracket, rollers carried by said bracket and engaging said track, means for securing said lens system to said support, a rack on said bracket, a pinion engaging said rack and means externally of said casing for effecting relative movement of said rack and pinion for adjusting said support to thereby adjust said lens system.

2. In a projector for projecting opaque material, a casing, a light source and reflectors in said casing, means for supporting material to be projected and a barrel containing a projector lens system, means in said casing for adjustably mounting said barrel and lens system comprising a rigidly supported track, a bracket, rollers carried by said bracket and engaging said track, means for securing said lens system to said bracket, and means for adjusting said bracket to thereby adjust said lens system, said adjusting means comprising a rack secured to said bracket and a shaft, a pinion on said shaft engaging said rack and a handle exterior of said casing and connected to said shaft for rotating said pinion to thereby adjust said rack and lens system.

3. In a projector for projecting opaque material, a casing, a light source and reflectors in said casing, means for supporting material to be projected and a projector lens system, means in said casing for adjusting said lens system comprising a support for said lens system, a rigidly supported track, a bracket adjustably mounted on said track, means for securing said lens system to said support, a rack on said bracket, a pinion engaging said rack and means externally of said casing for effecting relative movement of said rack and pinion for adjusting said support to thereby adjust said lens system, and a baffle connected to the wall of said casing and positioned between said light and said lens system for preventing stray light from said lamp from reaching said lens system.

4. In a projector for projecting opaque material, a casing, a light source in said casing, a projection lens system in optical alignment with said light source, platen means for supporting material to be projected, said platen means for supporting material to be projected comprising a spiral lift platen consisting of a base, a platen portion adapted to support material to be projected and an adjustable support therefor comprising a sleeve pivotally mounted on said base and having a plurality of spiral slots, a cross structure within said sleeve and engaging said slots and handle means connected to said sleeve whereby said sleeve may be turned to raise or lower said platen.

5. In a projector for projecting opaque material, a casing, a light source in said casing, a projection lens system in optical alignment with said light source, platen means for supporting material to be projected, said platen means for supporting material to be projected comprising a spiral lift platen consisting of a platen portion adapted to support material to be projected and an adjustable support therefor comprising a sleeve having a plurality of spiral slots formed therein, a cross structure within said sleeve and engaging said slots and handle means connected to said sleeve whereby said sleeve may be turned to raise or lower said platen and spring means within said sleeve for resiliently mounting said platen.

6. In a projector for projecting opaque material, a casing, a light source in said casing, a projection lens system in optical alignment with said light source, means for supporting material to be projected, said means for supporting material to be projected comprising a spiral lift platen consisting of a sleeve having a plurality of spiral slots, a cross structure engaging said slots and means whereby said sleeve may be turned to raise or lower said platen, a pin, said sleeve being pivotally mounted on said pin, a plate, and a cross member slidably mounted on pins secured to said plate for pushing said platen up or down depending on the direction of turning of said means for raising or lowering said platen.

7. In a projector for projecting opaque material, a casing, a light source in said casing adapted to illuminate material to be projected, a projection lens system for projecting an image of said material, a projection aperture in said casing, a platen for supporting objects in alignment with said projection aperture, and a slidable tray overlying said projection aperture and adapted to support material to be projected in alignment with said projection aperture, said tray being independent of said platen and forming a closure for said projection aperture.

8. In a projector for projecting opaque material, a casing, a light source in said casing adapted to illuminate material to be projected, a projection lens system for projecting an image of said material, a projection aperture in said casing, a platen for supporting objects in alignment with said projection aperture, and a slidable tray overlying said projection aperture and adapted to support material to be projected in alignment with said projection aperture, said tray being independent of said platen and forming a closure for said projection aperture, and said tray having a removable portion adapted to form a projection aperture through said tray upon removal of said portion whereby objects on said platen may be projected without removal of said tray from the projector.

9. In a projector for projecting opaque material, a casing, a light source in said casing adapted to illuminate material to be projected, a projection lens system for projecting an image of said material, means for supporting material to be projected, a ventilation system comprising, an exhaust opening in a wall of said casing, a motor and blower for exhausting air through said exhaust opening, a duct connecting said blower and said exhaust opening, a butterfly valve in said duct and means externally of said casing for controlling said butterfly valve and thereby control the rate of discharge of air from said casing.

10. In a projector for projecting opaque material, a casing, a light source in said casing adapted to illuminate material to be projected, a projection lens system for projecting an image of said material, means for supporting material to be projected, a ventilation system comprising, an exhaust opening in a wall of said casing, a motor and blower for exhausting air through said exhaust opening, a duct connecting said blower and said exhaust opening, a butterfly valve in said duct and means externally of said casing for controlling said butterfly valve and thereby control the rate of discharge of air from said casing, and ventilation openings in the wall of said casing adapted to allow the drawing of cooler air into said casing upon the exhaust of heated air through said exhaust opening.

JAMES Y. TAYLOR.

REFERENCES CITED

The following references are of record in the file of this patent:

UNITED STATES PATENTS

| Number | Name | Date |
| --- | --- | --- |
| 1,213,731 | Bornmann | Jan. 23, 1917 |
| 1,341,667 | Ott et al. | June 1, 1920 |
| 1,424,847 | Ott et al. | Aug. 8, 1922 |
| 1,848,378 | Ott | Mar. 8, 1932 |
| 1,879,737 | De Riccio | Sept. 27, 1932 |
| 2,283,268 | Kreinin | May 19, 1942 |
| 2,332,691 | Blaisdell | Oct. 26, 1943 |
| 2,395,561 | Osterberg et al. | Feb. 26, 1946 |
| 2,463,026 | Field | Mar. 1, 1949 |